United States Patent
Lafferty et al.

(10) Patent No.: US 11,694,054 B2
(45) Date of Patent: Jul. 4, 2023

(54) IDENTIFIER

(71) Applicant: Please Hold (UK) Limited, Manchester (GB)

(72) Inventors: Daniel Patrick Lafferty, Manchester (GB); Alice Salmon, Manchester (GB); Lucy Drennan, Manchester (GB)

(73) Assignee: PLEASE HOLD (UK) LIMITED, Manchester (GB)

( * ) Notice: Subject to any disclaimer, the term of this patent is extended or adjusted under 35 U.S.C. 154(b) by 410 days.

(21) Appl. No.: 16/757,321

(22) PCT Filed: Oct. 19, 2018

(86) PCT No.: PCT/GB2018/053042
§ 371 (c)(1),
(2) Date: Apr. 17, 2020

(87) PCT Pub. No.: WO2019/077374
PCT Pub. Date: Apr. 25, 2019

(65) Prior Publication Data
US 2020/0302258 A1    Sep. 24, 2020

(30) Foreign Application Priority Data

Oct. 20, 2017   (GB) ..................................... 1717279

(51) Int. Cl.
*G06Q 20/32*   (2012.01)
*G10L 19/00*   (2013.01)
(Continued)

(52) U.S. Cl.
CPC ......... *G06K 19/0728* (2013.01); *G06F 21/35* (2013.01); *G06Q 20/3272* (2013.01);
(Continued)

(58) Field of Classification Search
CPC ... G10L 19/008; G10L 19/02; G10L 19/0204; G10L 19/18; G10L 19/167; G10L 19/00;
(Continued)

(56) References Cited

U.S. PATENT DOCUMENTS 6,671,669 B1   12/2003   Garudadri
8,355,514 B2   1/2013   Rhoads
(Continued)

FOREIGN PATENT DOCUMENTS

| EP | 28583282 A1 | 4/2015 |
|---|---|---|
| GB | 2566759 B | 4/2019 |
| WO | 2014059520 A1 | 4/2014 |

OTHER PUBLICATIONS

Combined Search and Examination Report under Sections 17 and 18(3) for GB Application No. 1717281.8, entitled "Audio Signal," dated Apr. 18, 2018.
(Continued)

*Primary Examiner* — Linda Wong
(74) *Attorney, Agent, or Firm* — Hamilton, Brook, Smith & Reynolds, P.C.

(57) ABSTRACT

A computer device (100), configured to encode identifiers by providing audio identifiers therefrom, is described. The computer device (100) is configured to provide a set of audio signals as respective bitstreams. Each audio signal of the set of audio signals is defined based, at least in part, on audio signal information including at least one of a type, a fundamental frequency, a time signature and a time. Each audio signal comprises a set of audio segments. Each audio segment of the set of audio segments is defined based, at least in part, on audio segment information including at least one of a frequency, an amplitude, a transform, a time duration and an envelope. The computer device (100) is configured to receive an identifier and select a subset of audio signals from the set of audio signals according to the
(Continued)

received identifier based, at least in part, on the audio signal information and/or the audio segment information. The computer device (100) is configured to process the audio selected subset of audio signals by combining the selected subset of audio signals to provide an audio identifier. The computer device (100) is configured to output the audio identifier in an output audio signal as an output bitstream, wherein the audio identifier encodes the identifier. Also described is a method of encoding identifiers by providing audio identifiers therefrom.

20 Claims, 12 Drawing Sheets

(51) Int. Cl.
| | |
|---|---|
| *G10L 19/018* | (2013.01) |
| *G06K 19/07* | (2006.01) |
| *G06F 21/35* | (2013.01) |
| *G10H 7/00* | (2006.01) |

(52) U.S. Cl.
CPC ............ *G10L 19/00* (2013.01); *G10L 19/018* (2013.01); *G10H 7/00* (2013.01); *G10H 2240/041* (2013.01)

(58) Field of Classification Search
CPC ......... G10L 25/18; G10L 25/60; G10L 21/00; G10L 19/018; G10L 13/00; G10L 25/00; G10L 25/93; G10L 21/02; G10L 21/038; G11B 20/00891; H04H 20/88; H04H 20/89; G06K 19/0728; G06F 21/35; G06F 21/30; G06Q 20/3272; G10H 7/00; G10H 2240/041; G10H 2210/101; G10H 2240/011
See application file for complete search history.

(56) References Cited

U.S. PATENT DOCUMENTS

| | | | |
|---|---|---|---|
| 9,471,698 | B1 | 10/2016 | Liu et al. |
| 10,249,289 | B2* | 4/2019 | Chun .................... G10L 13/027 |
| 2006/0200344 | A1 | 9/2006 | Kosek |
| 2006/0247922 | A1 | 11/2006 | Hetherington |
| 2010/0106507 | A1 | 4/2010 | Muesch |
| 2011/0040567 | A1 | 2/2011 | Oh et al. |
| 2011/0257974 | A1 | 10/2011 | Kristjansson et al. |
| 2013/0151242 | A1* | 6/2013 | Kim ........................ G10L 19/16 |
| | | | 704/201 |
| 2014/0108252 | A1 | 4/2014 | Itwaru et al. |
| 2016/0335043 | A1 | 11/2016 | Guyott |
| 2017/0251308 | A1* | 8/2017 | Cook ................ H04M 1/72409 |
| 2017/0339496 | A1 | 11/2017 | Epstein |
| 2018/0096677 | A1* | 4/2018 | Pollet ..................... G10L 13/10 |
| 2020/0065262 | A1 | 2/2020 | Bellorado et al. |
| 2021/0158833 | A1 | 5/2021 | Cooke |

OTHER PUBLICATIONS

International Search Report for International Application No. PCT/GB2018/053041, entitled Audio Signal, dated Nov. 27, 2018.
"Noise gate," Wikepedia, retrieved from the Internet: URL: https://en.wikipedia.org/w/index.php?title=Noise_gate&oldid=787373360 [retrieved on Nov. 19, 2018] pp. 1-5 (Jun. 25, 2017).
Search and Examination Report for Application No. GB1717279.2 dated Apr. 20, 2018.
International Search Report and Written Opinion for Application No. PCT/GB2018/053042, titled: IDENTIFIER, dated Nov. 30, 2018.

\* cited by examiner

IDENTIFIER

This application is the U.S. National Stage of International Application No. PCT/GB2018/053042, filed Oct. 19, 2018, which designates the U.S., published in English, and claims priority under 35 U.S.C. § 119 or 365(c) to GB Application No. 1717279.2, filed Oct. 20, 2017. The entire teachings of the above applications are incorporated herein by reference.

BACKGROUND

Technical Field

The present invention relates generally to the field of identifiers. More particularly, the present invention relates to a computer device for and a method of providing an audio identifier and an audio identifier.

Related Art

Generally, identifiers are used to identify goods and/or services. Codes such as bar codes, QR® codes and VCodes® typically encode identifiers that may be used to identify goods and/or services and/or origins thereof. Typically, these codes are printed on goods or displayed on display apparatuses, imaged optically and the respective encoded identifiers determined therefrom.

Problems arise with these conventional coded identifiers. Since the codes are typically imaged optically, for example by scanning and/or photography, line of sight of the codes is required. That is, obscuring of the codes may prevent determination of the respective encoded identifiers from images thereof. Further, physical damage to the codes may similarly prevent such determination. In addition, optical resolution of the codes is required such that the images must generally be obtained from proximally the codes. Furthermore, appropriate lighting is required to obtain the images. Additionally, the codes are generally user-unintelligible for human users, for example being non-readable, unmemorable and/or incomprehensible for the human users.

The example embodiments have been provided with a view to addressing at least some of the difficulties that are encountered with identifiers, whether those difficulties have been specifically mentioned above or will otherwise be appreciated from the discussion herein.

SUMMARY

According to the present invention there is provided a computer device, a method, an audio identifier and a computer-readable storage medium as set forth in the appended claims. Additional features of the invention will be apparent from the dependent claims, and the description herein.

There now follows a summary of various aspects and advantages according to embodiments of the invention. This summary is provided as an introduction to assist those skilled in the art to more rapidly assimilate the detailed discussion herein and is not intended in any way to limit the scope of the claims that are appended hereto.

In general, there is described a computer device for and a method of encoding identifiers by providing audio identifiers therefrom. By providing a set of audio signals as respective bitstreams, selecting a subset of audio signals from the set of audio signals according to a received identifier, combining the selected subset of audio signals to provide an audio identifier and outputting the audio identifier in an output audio signal as an output bitstream, the audio identifier thus encodes the identifier. In other words, elements, features and/or information of the identifier are encoded by corresponding and/or respective elements, features and/or information of the audio identifier. Hence, an unique identifier may be uniquely encoded as an unique audio identifier, for example. In this way, decoding of the audio identifier to identify the identifier may be performed similarly.

Since the audio identifier may be transmitted acoustically, line of sight is not required, unlike conventional identifiers. Further, the audio identifier is not subject to the physical damage or obscuring of conventional identifiers. In addition, reception of the audio identifier may be remote from a transmitter thereof. Furthermore, reception of the audio identifier may be in absence of lighting. The audio identifier may be time-varying, such that a and/or any and/or each part and/or portion thereof may encode the identifier. In this way, redundancy and/or error correction may be included in the audio identifier such that an error and/or failure in reception of the audio identifier may be corrected. Additionally, since the audio identifier is provided by an acoustic signal, the audio identifier may be user-intelligible for human users, for example being hearable, memorable and/or comprehensible for the human users. In one preferable example, the audio identifier and/or the output audio signal comprises music, thereby increasing memorability and/or comprehensibility of the audio identifier. For example, a human user (i.e. listener) may better remember an audio signal, such as comprising music, than a graphic image such as a conventional code. Furthermore, the human user (i.e. listener) may better distinguish two similar audio signals, such as comprising music, than two similar graphic images such as two similar conventional codes. Generally, music is the ordering of tones or sounds in succession, in combination, and in temporal relationships to produce a composition having unity and continuity. Generally, music may comprise vocal, instrumental, or mechanical sounds having rhythm, melody, and/or harmony.

In addition, since the identifier is provided as an audio identifier, audio identifiers as described herein may be suitable for blind and/or partially-sighted human users, in contrast to conventional graphical identifiers. In addition, since the identifier is provided as an audio identifier, audio identifiers as described are suitable for security protocols implemented, for user authentication and/or authorisation on computer devices and/or for network services including telephony services. Typically, user identifiers such as usernames and respective passwords may be used for security protocols. Typically, these conventional user identifiers are input via keyboards and may be output via display apparatuses. However, audio identifiers as described herein may be used for telephony services, for example, whereby a human user may verify an origin of a call according to an audio identifier output to the human user, thereby confirming an identity of a caller. Additionally and/or alternatively, audio identifiers as described herein may be used for telephone banking, for example, wherein a human user may be required to confirm an audio identifier output to the human user, thereby confirming identity of the human user. Additionally and/or alternatively, audio identifiers as described herein may be used for online banking, for example, wherein a user may be required to confirm an audio identifier output to the user, thereby distinguishing between a human user and a non-human user, as conventionally provided by a reCAPTCHA®.

In one example, there is provided a computer device, including at least a processor and a memory, configured to encode identifiers by providing audio identifiers therefrom, the computer device configured to: provide a set of audio signals as respective bitstreams, wherein each audio signal of the set of audio signals is defined based, at least in part, on audio signal information including at least one of a type, a fundamental frequency, a time signature and a time, wherein each audio signal comprises a set of audio segments, wherein each audio segment of the set of audio segments is defined based, at least in part, on audio segment information including at least one of a frequency, an amplitude, a transform, a time duration and an envelope; receive an identifier and select a subset of audio signals from the set of audio signals according to the received identifier based, at least in part, on the audio signal information and/or the audio segment information; process the audio selected subset of audio signals by combining the selected subset of audio signals to provide an audio identifier; and output the audio identifier in an output audio signal as an output bitstream; wherein the audio identifier encodes the identifier.

Additionally, alternatively and/or more generally, there is provided an encoder configured to encode identifiers by providing audio identifiers therefrom, the encoder configured to: provide a set of audio signals as respective bitstreams, wherein each audio signal of the set of audio signals is defined based, at least in part, on audio signal information including at least one of a type, a fundamental frequency, a time signature and a time, wherein each audio signal comprises a set of audio segments, wherein each audio segment of the set of audio segments is defined based, at least in part, on audio segment information including at least one of a frequency, an amplitude, a transform, a time duration and an envelope; receive an identifier and select a subset of audio signals from the set of audio signals according to the received identifier based, at least in part, on the audio signal information and/or the audio segment information; process the audio selected subset of audio signals by combining the selected subset of audio signals to provide an audio identifier; and output the audio identifier in an output audio signal as an output bitstream; wherein the audio identifier encodes the identifier. The encoder may be further configured as described herein with respect to the computer device, mutatis mutandis.

In one example, the computer device is configured to combine the selected subset of audio signals by summing two of the selected subset of audio signals.

In one example, the computer device is configured to combine the selected subset of audio signals by joining two of the selected subset of audio signals.

In one example, the computer device is configured to insert an audio segment in the joined two of the selected subset of audio signals.

In one example, the computer device is configured to classify the audio signals of the set of audio signals according to a set of classifications and store the classified audio signals according to the set of classifications.

In one example, the computer device is configured to select the subset of audio signals from the set of audio signals according to the received identifier by selecting the subset of audio signals from the set of audio signals according to the received identifier based, at least in part, on the set of classifications.

In one example, the computer device is configured to transmit at least a part of the audio identifier in the output audio signal via a network.

In one example, the network comprises a telephony service.

In one example, the computer device to configured to receive at least a part of the transmitted audio identifier and to identify the identifier by decoding the received part of the transmitted audio identifier.

Additionally, alternatively and/or more generally, there is provided a decoder configured to decode an audio identifier, as described herein, and to identify an identifier encoded by the audio identifier. The decoder may be further configured as described herein with respect to the computer device, mutatis mutandis.

In one example, the audio identifier and/or the output audio signal comprises music.

In one example, there is provided a method of encoding identifiers by providing audio identifiers therefrom on a computer device, the method being implemented by hardware of the computer device including at least a processor and a memory, the method comprising providing a set of audio signals as respective bitstreams, wherein each audio signal of the set of audio signals is defined based on audio signal information including at least one of a type, a fundamental frequency, a time signature and a time, wherein each audio signal comprises a set of audio segments, wherein each audio segment of the set of audio segments is defined based on audio segment information including at least one of a frequency, an amplitude, a transform, a duration and an envelope; receiving an identifier and selecting a subset of audio signals from the set of audio signals according to the received identifier based, at least in part, on the audio signal information and/or the audio segment information; processing the selected subset of audio signals by combining the selected subset of audio signals to provide an audio identifier; and outputting the audio identifier in an output audio signal as an output bitstream; wherein the audio identifier encodes the identifier.

Additionally, alternatively and/or more generally, there is provided a method of encoding identifiers by providing audio identifiers therefrom on a computer device, the method being implemented by hardware of the computer device including at least a processor and a memory, the method comprising providing a set of audio signals as respective bitstreams, wherein each audio signal of the set of audio signals is defined based on audio signal information including at least one of a type, a fundamental frequency, a time signature and a time, wherein each audio signal comprises a set of audio segments, wherein each audio segment of the set of audio segments is defined based on audio segment information including at least one of a frequency, an amplitude, a transform, a duration and an envelope; receiving an identifier and selecting a subset of audio signals from the set of audio signals according to the received identifier based, at least in part, on the audio signal information and/or the audio segment information; processing the selected subset of audio signals by combining the selected subset of audio signals to provide an audio identifier; and outputting the audio identifier in an output audio signal as an output bitstream; wherein the audio identifier encodes the identifier. The method of encoding may include any of the steps as described herein with respect to the method of encoding identifiers by providing audio identifiers therefrom on the computer device, mutatis mutandis.

In one example, combining the selected subset of audio signals comprises summing two of the selected subset of audio signals.

In one example, combining the selected subset of audio signals comprises joining two of the selected subset of audio signals.

In one example, joining the two of the selected subset of audio signals comprises inserting an audio segment therein.

In one example, the method comprises classifying the audio signals of the set of audio signals according to a set of classifications; and storing the classified audio signals according to the set of classifications.

In one example, selecting the subset of audio signals from the set of audio signals according to the received identifier comprises selecting the subset of audio signals from the set of audio signals according to the received identifier based, at least in part, on the classifications.

In one example, the method comprises transmitting at least a part of the audio identifier in the output audio signal via a network.

In one example, the network comprises a telephony service.

In one example, the method comprises receiving at least a part of the transmitted audio identifier and identifying the identifier by decoding the received part of the transmitted audio identifier.

Additionally, alternatively and/or more generally, there is provided a method of decoding an audio identifier, as described herein, and identifying an identifier encoded by the audio identifier. The method of decoding may include any of the steps as described herein with respect to the method of decoding identifiers on the computer device, mutatis mutandis.

In one example, the audio identifier and/or the output audio signal comprises music.

In one example, there is provided a tangible non-transient computer-readable storage medium having recorded thereon instructions which, when implemented by a computer device, cause the computer device to be arranged as set forth herein and/or which cause the computer device to perform any of the methods as set forth herein.

In one example, there is provided an audio identifier provided by a computer device as set forth herein and/or a method as set forth herein.

In one example, the audio identifier is included in a combined audio signal, the combined audio signal comprising a first audio signal including speech and a second audio signal, as described below. In one example, the first audio signal and/or the second audio signal comprises the audio identifier.

Preferably, the second audio signal comprises the audio identifier.

In one example, the computer device is further configured to: receive a bitstream comprising a combined audio signal, the combined audio signal comprising a first audio signal including speech and a second audio signal; compress the combined audio signal to provide a compressed audio signal; and control a dynamic range of the compressed audio signal to provide an output audio signal; whereby a quality of the speech included in the output audio signal is improved.

In one example, the computer device is configured to compress the combined audio signal by selectively reducing an amplitude of the second audio signal.

In one example, the computer device is configured to compress the combined audio signal by selectively increasing an amplitude of the speech included in the first audio signal.

In one example, the computer device is configured to compress the combined audio signal by matching amplitudes of the first audio signal and the second audio signal.

In one example, the computer device is configured to: selectively harmonically excite the compressed audio signal.

In one example, the computer device is configured to receive a first bitstream including the first audio signal and a second bitstream including the second audio signal; and sum the first bitstream and the second bitstream, thereby providing the combined audio signal.

In one example, the computer device is configured to normalize the first audio signal included in the first bitstream and/or the second audio signal included in the second bitstream.

In one example, the computer device is configured to adjust an amplitude of the second audio signal included in the second bitstream.

In one example, the second audio signal comprises music.

In one example, the computer device is configured to transmit the output audio signal via transmission network having limited bandwidth, for example a telephony service.

In one example, the method further comprises: receiving a bitstream comprising a combined audio signal, the combined audio signal comprising a first audio signal including speech and a second audio signal; compressing the combined audio signal to provide a compressed audio signal; and controlling a dynamic range of the compressed audio signal to provide an output audio signal; whereby a quality of the speech included in the output audio signal is improved.

In one example, the compressing the combined audio signal comprises selectively reducing an amplitude of the second audio signal.

In one example, the compressing the combined audio signal comprises selectively increasing an amplitude of the speech included in the first audio signal.

In one example, the compressing the combined audio signal comprises matching amplitudes of the first audio signal and the second audio signal.

In one example, the method comprises selectively harmonically exciting the compressed audio signal.

In one example, the method comprises receiving a first bitstream including the first audio signal and a second bitstream including the second audio signal; and summing the first bitstream and the second bitstream, thereby providing the combined audio signal.

In one example, the method comprises normalizing the first audio signal included in the first bitstream and/or the second audio signal included in the second bitstream.

In one example, the method comprises adjusting an amplitude of the second audio signal included in the second bitstream.

In one example, the second audio signal comprises music.

In one example, the method comprises transmitting the output audio signal via a transmission network having a limited bandwidth, for example a telephony service.

BRIEF DESCRIPTION OF THE DRAWINGS

For a better understanding of the invention, and to show how example embodiments may be carried into effect, reference will now be made to the accompanying drawings in which.

DETAILED DESCRIPTION

At least some of the following examples provide a computer device for and a method of encoding identifiers by providing audio identifiers therefrom. Many other advantages and improvements will be discussed in more detail herein.

Figure 1:
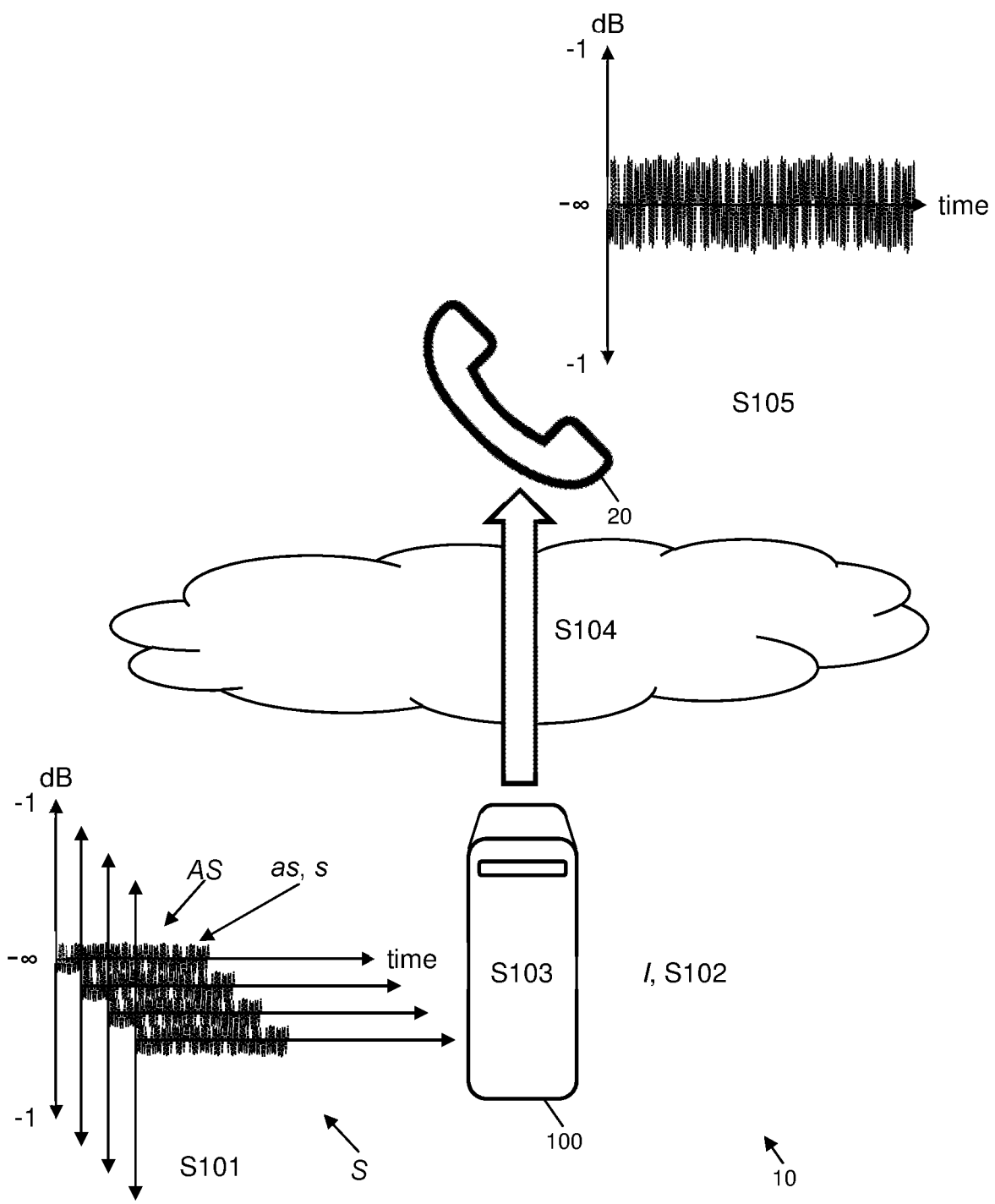
FIG. 1 is a schematic view of a system including a computer device according to an exemplary embodiment.

FIG. 1 is a schematic overview of part of a system 10 including an example computer device 100. Particularly, the computer device 100 is configured to encode identifiers by providing audio identifiers therefrom. In this way, communication of the identifiers may be improved.

The computer device 100 is configured to provide a set S of audio signals AS as respective bitstreams, as shown schematically at S101. Each audio signal AS of the set S of audio signals AS is defined based, at least in part, on audio signal information including at least one of a type, a fundamental frequency, a time signature and a time. In one example, each audio signal AS of the set S of audio signals AS is defined based on, for example by, the audio signal information including at least one of, preferably at least two of, more preferably at least three of, most preferably all of, a type, a fundamental frequency, a time signature and a time. Each audio signal AS comprises a set s of audio segments as, wherein each audio segment as of the set s of audio segments as is defined based, at least in part, on audio segment information including at least one of a frequency, an amplitude, a transform, a time duration and an envelope. In one example, each audio segment as of the set s of audio segments as is defined based on, for example by, the audio segment information including at least one of, preferably at least two of, more preferably at least three of, even more preferably at least four of, most preferably all of, a frequency, an amplitude, a transform, a time duration and an envelope. In this example, each audio signal AS comprises and/or is a single channel (i.e. a monophonic audio signal). The computer device 100 is configured to receive an identifier I, as shown schematically at S102. The computer device 100 is configured to select a subset SS of audio signals AS from the set S of audio signals AS according to the received identifier/based, at least in part, on the audio signal information and/or the audio segment information. The computer device 100 is configured to process the selected subset SS of audio signals AS by combining the selected subset SS of audio signals AS to provide an audio identifier AI, as shown schematically at S103. The computer device 100 is configured to output the audio identifier AI in an output audio signal as an output bitstream, wherein the audio identifier AI encodes the identifier I. In this example, the output audio signal AS is transmitted via a network 1, as shown schematically at S104, and output via a telephone 20 to a human listener, at S105. Additionally and/or alternatively, the output audio signal AS may be transmitted via the network 1, received by another computer device optionally output via a speaker to the human listener and/or decoded.

Generally, frequencies in a frequency range from 20 Hz to 20,000 Hz (also known as an audio range) are capable of being heard by human listeners and are known as audio or sonic frequencies. Speech of a typical adult male has a fundamental frequency from 85 to 180 Hz, while speech of a typical adult female has a fundamental frequency from 165 to 255 Hz.

Generally, a voice frequency (VF) (also known as a voice band) is a frequency, within part of the audio range, that is used for transmission of speech. In telephony services, the usable voice frequency band is from about 300 Hz to 3,400 Hz. That is, the fundamental frequencies of most speech are less than the lower limit of the VF band. Hence, rather than listening to a fundamental frequency, the human listener typically instead listens to only a part of a harmonic series of the fundamental frequency. However, by listening to the part of the harmonic series, an impression of hearing the fundamental frequency may be created. In one example, the audio identifier AI comprises and/or consists of sounds in the usable voice frequency band of a telephony service, for example from about 300 Hz to 3,400 Hz. In this way, information in the audio identifier AI is not lost, for example, during transmission via the telephony service, permitting decoding of the identifier/therefrom.

A bandwidth allocated for a single voice-frequency transmission channel, for example for a telephony service, is usually 4 kHz, including guard bands, allowing a sampling rate of 8 kHz to be used as the basis of a pulse code modulation (PCM) system used for digital public switched telephone networks (PSTNs). PSTNs aggregate the world's circuit-switched telephone networks that are operated by national, regional, and/or local telephony operators, providing infrastructure and services for public telecommunication. Per the Nyquist-Shannon sampling theorem, the sampling rate of 8 kHz must be at least twice the highest component of the voice frequency via appropriate filtering prior to sampling at discrete times (equivalent to 4 kHz), for effective reconstruction of the voice signal.

Wideband audio, also known as HD voice, extends the frequency range of audio signals transmitted over telephone lines to from 50 Hz to 7 kHz, resulting in higher quality speech. However, wideband audio is generally not available.

In this simplified example, the computer device 100 is coupled by the system 10 to the telephone 20 via the network 1. For example, the network 1 can be a private network, a virtual private network, an intranet, a cloud, the Internet, a telephony service or a broadcasting network, such as television or radio.

Figure 2:
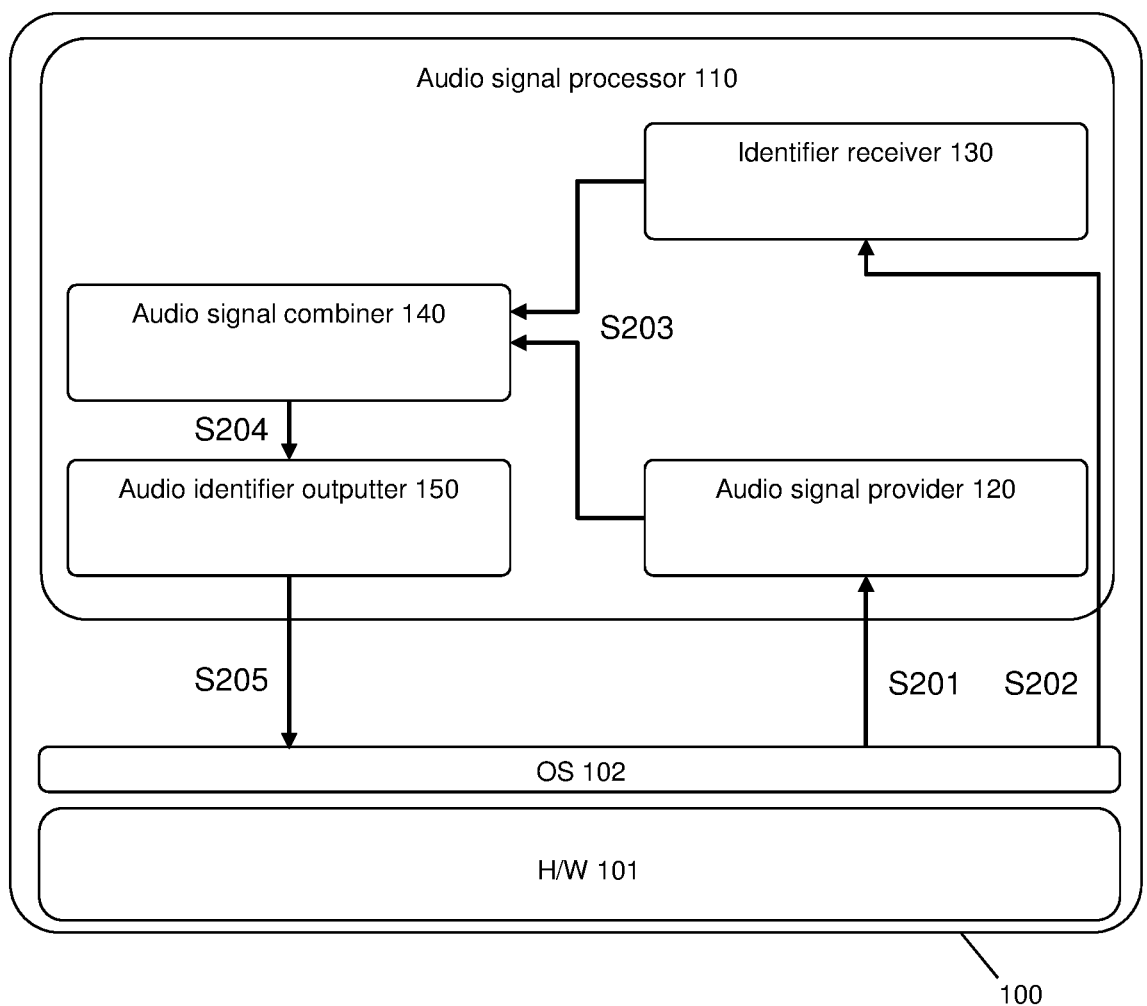
FIG. 2 is a schematic view of the computer device of FIG. 1, in more detail.

FIG. 2 is a schematic view of the computer device 100, in more detail.

In this example, the computer device 100 comprises an audio signal processor 110, wherein the audio signal processor 110 is configured to provide the set S of audio signals AS as respective bitstreams. As described above, each audio signal AS of the set S of audio signals AS is defined based, at least in part, on audio signal information including at least one of a type, a fundamental frequency, a time signature and a time. As described above, each audio signal AS comprises a set s of audio segments as, wherein each audio segment as of the set s of audio segments as is defined based, at least in part, on audio segment information including at least one of a frequency, an amplitude, a transform, a time duration and an envelope. The audio signal processor 110 is configured to receive an identifier I. The audio signal processor 110 is configured to select a subset SS of audio signals AS from the set S of audio signals AS according to the received identifier/based, at least in part, on the audio signal information and/or the audio segment information. The audio signal processor 110 is configured to process the selected subset SS of audio signals AS by combining the selected subset SS of audio signals AS to provide the audio identifier AI. The computer device 100 is configured to output the audio identifier AI in an output audio signal as an output bitstream, wherein the audio identifier AI encodes the identifier I.

The computer device 100 may take any suitable form factor, which might be a server, a desktop computer, a portable computing device, laptop, tablet, smartphone, an audio processor, etc. The illustrated computer device 100 comprises a layer of physical hardware H/W 101, which suitably includes memory, processors (CPUs), I/O input/output interfaces (e.g. NIC network interface cards, USB universal serial bus interfaces, etc.), storage (e.g. solid state non-volatile storage or hard disk drive) and so on. The hardware layer 101 supports an operating system 102 to provide a runtime environment for execution of user processes or productivity applications. This runtime environment typically provides resources such as installed software, system agent services, drivers, and files.

In more detail, the audio signal processor 110 comprises an audio signal provider 120, an identifier receiver 130, an audio signal combiner 140 and an audio identifier outputter 150. While in this example, the audio signal provider 120, the identifier receiver 130, the audio signal combiner 140 and the audio identifier outputter 150, it should be understood that this arrangement is not limiting. For example, the audio signal processor 110 may be configured to provide the processing by the audio signal provider 120, the identifier receiver 130, the audio signal combiner 140 and/or the audio identifier outputter 150. For example, the audio signal provider 120, the identifier receiver 130, the audio signal combiner 140 and/or the audio identifier outputter 150 may in turn be provided by one or more units, modules, dynamic link libraries (DLLs), plugins, services or servers, respectively.

In more detail, the computer device 100, for example the audio signal provider 120, is configured to provide the set S of audio signals AS as respective bitstreams. The respective bitstreams may originate from audio stored in an uncompressed audio format, for example WAV, AIFF, AU or raw header-less PCM, a lossless compression audio format, for example FLAC, TTA, ATRAC Advanced Lossless, ALAC MPEG-4 SLS, MPEG-4 ALS, MPEG-4 DST, Windows Media Audio Lossless (WMA Lossless), and Shorten (SHN) and/or a lossy compression audio format, for example Opus, MP3, Vorbis, Musepack, AAC, ATRAC and Windows Media Audio Lossy (WMA lossy). Alternatively and/or additionally, the respective bitstreams may originate from audio stored in a multimedia or video format. Alternatively and/or additionally, the respective bitstreams may originate from a microphone, at least in part. The respective bitstreams may be stored on the computer device 100, for example in storage thereof.

The set S of audio signals AS may include at least 100 audio signals AS, preferably at least 1000 audio signals AS, more preferably at least 10,000 audio signals AS, most preferably at least 100,000 audio signals AS. It should be understood that the audio signals included in the set S are AS different i.e. non-identical. The subset SS of audio signals AS selected from the set S of audio signals AS may include at least 2 audio signals AS, preferably at least 4 audio signals AS, more preferably at least 8 audio signals AS, most preferably at least 16 audio signals AS. In this way, an increased number of unique audio identifiers may be provided by combination of the selected subset SS thereof. For example, if the set S of audio signals AS includes 100 audio signals AS and the subset SS of audio signals AS selected from the set S of audio signals AS includes 2 audio signals AS, then 4,950 unique audio identifiers may be provided. For example, if the set S of audio signals AS includes 1,000 audio signals AS and the subset SS of audio signals AS selected from the set S of audio signals AS includes 4 audio signals AS, then about $4.14 \times 10^{10}$ unique audio identifiers may be provided. For example, if the set S of audio signals AS includes 10,000 audio signals AS and the subset SS of audio signals AS selected from the set S of audio signals AS includes 8 audio signals AS, then about $2.47 \times 10^{27}$ unique audio identifiers may be provided. In this way, the identifier may be uniquely encoded in the audio identifier.

As described above, each audio signal AS of the set S of audio signals AS is defined based, at least in part, on audio signal information including at least one of a type, a fundamental frequency, a time signature and a time. The type may be a stem type of the audio signal AS, for example a harmony stem, a melody stem, a bass stem and/or a drum (also known as percussion) stem. The fundamental frequency may be a key of the audio signal AS, for example a group of pitches (also known as a scale) that includes a tonic note and one or more corresponding chords. The time signature may be a tempo in beats per minute (bpm) of the audio signal AS, for example in a range from 30 bpm to 240 bpm, preferably in a range from 60 bpm to 180 bpm, more preferably in a range from 90 bpm to 150 bpm. The time may be a length of the audio signal AS, for example in a range of from 1 s to 600 s, preferably from 10 s to 360 s, more preferably from 30 s to 120 s. Additionally and/or alternatively, the length of the audio signal AS, may be for example in a range of from 1 bar to 16 bars, preferably in a range from 4 bars to 12 bars, for example 8 bars.

In one example, the fundamental frequency may be in a range from 10 Hz to 16,000 Hz, preferably in a range from 60 Hz to 4,000 Hz, more preferably from 125 Hz to 1,000 Hz. In one example, the fundamental frequency is a predetermined frequency, for example of a set of predetermined frequencies. For example, the fundamental frequency may be of a named note, for example C, C#/Db, D, D#/Eb, F, F#/Gb, G, G#/Ab, A, A#/Bb, B, of an octave, for example from 0 to 10 according to the Scientific Pitch Notation format, also known as American Pitch Notation and International Pitch Notation. Table 1 details frequencies of named notes, specifically C, C#/Db, D, D#/Eb, F, F#/Gb, G, G#/Ab, A, A#/Bb, B, of octave 4. If the fundamental frequency is a specific frequency, such as a named note as described above, the fundamental frequency may be used to calibrate the received audio identifier (i.e. single point calibration). In this way, transmission and/or reception aberrations, shifts, distortions and/or errors of the audio identifier may be compensated for, improving identification of a received audio identifier. Furthermore, harmonic frequencies of the fundamental frequency may be used to improve calibration (i.e. multiple point calibration).

TABLE 1

Example set of fundamental frequencies

| Note | Octave | Frequency (Hz) | Notes |
|---|---|---|---|
| C | 4 | 261.626 | Middle C |
| C#/Db | 4 | 277.183 | |
| D | 4 | 293.665 | |
| D#/Eb | 4 | 311.127 | |
| E | 4 | 329.628 | |

TABLE 1-continued

Example set of fundamental frequencies

| Note | Octave | Frequency (Hz) | Notes |
|---|---|---|---|
| F | 4 | 349.228 | |
| F#/Gb | 4 | 369.994 | |
| G | 4 | 391.995 | |
| G#/Ab | 4 | 415.305 | |
| A | 4 | 440 | Tuning reference note |
| A#/Bb | 4 | 466.164 | |
| B | 4 | 493.883 | |

As described above, each audio signal AS comprises a set s of audio segments as, wherein each audio segment as of the set s of audio segments as is defined based, at least in part, on audio segment information including at least one of a frequency, an amplitude, a transform, a time duration and an envelope. The audio segments as may also be known as fragments and include one or more sounds perceptible by a human listener. The audio segments as may be consecutive, concurrent or partially concurrent, for example overlapping. For example, each audio signal AS may be divided by time, equally or non-equally, into the set s of audio segments as. The frequency may be a pitch of a sound included in an audio segment as, for example in a range from 20 Hz to 20,000 Hz, preferably in a range from 100 Hz to 10,000 Hz, more preferably in a range from 300 Hz to 3,400 Hz. An audio segment as may include a plurality of frequencies, for example harmonics of a frequency. The amplitude may be an intensity, a level, a volume or a loudness of a sound included in an audio segment as, for example in a range from 0 dB to 150 dB, preferably in a range from 30 dB to 95 dB, more preferably in a range from 60 dB to 80 dB. An overall power of the output signal may be in a range from −20 dB to 0 dB, preferably in a range from −15 dB to 0 dB, more preferably in a range from −10 dB to 0 dB. The transform may be a timbre of a sound included in an audio segment as and may be represented, for example, by a fast Fourier transform (FFT), an inverse fast Fourier transform (iFFT), a discrete Fourier transform (DFT) and/or a power spectrum. The transform may be determined for a frame having a frame size of, for example 512, 1024, 2048 or more samples i.e. $2^N$ samples, wherein N is a natural number. A given note (i.e. a pitch) played on different musical instruments, for example, may have different FFTs. The duration may be the length of an audio segment as, for example in a range from 10 ms to 60 s, preferably in a range from 100 ms to 30 s, more preferably in a range from 1 s to 10 s. The envelope may include an attack, a sustain, and/or a decay of a sound included in an audio segment as. The attack may include changes occurring before the sound reaches a steady-state intensity thereof. The sustain may be a steady state of the sound at a maximum intensity thereof. The decay may be a rate at which an intensity of the sound decreases, for example fades to silence.

The computer device 100, for example the identifier receiver 130, is configured to receive the identifier I. The identifier/may comprise, for example, a numeric identifier such as a number or a Globally Unique Identifier (GUID), an alphabetical identifier such as a letter or a word (i.e. a plurality of letters), an alphanumeric identifier (i.e. comprising at least one letter and at least one number) such as a reference, a graphical identifier such as a barcode, a QR code or a V code, and/or a binary encoded identifier. The identifier/may comprise a plurality of such identifiers. In one example, the identifier I comprises a plurality of words. The identifier receiver 130 may be configured to receive the identifier I via the OS 102, for example, from storage of the computer device 100, from an input device of the computer device 100 and/or from the network 1.

The computer device 100, for example the audio signal processor 110, is configured to select the subset SS of audio signals AS from the set S of audio signals AS according to the received identifier/based, at least in part, on the audio signal information and/or the audio segment information. Hence, the subset SS of audio signals AS is selected from the set S of audio signals AS according to the received identifier I. In this way, the subset SS of audio signals AS corresponds to or maps to the received identifier I, such that the received identifier/may be encoded, for example uniquely, by the subset of audio signals AS. Furthermore, the subset SS of audio signals AS is selected from the set S of audio signals AS according to the received identifier/based, at least in part, on the audio signal information and/or the audio segment information. That is, the audio signals AS of the subset SS of audio signals AS are complementary and/or mutually-related by, at least in part, on the audio signal information and/or the audio segment information. For example, the audio signals AS of the subset SS of audio signals AS may have complementary or different types. For example, the audio signals AS of the subset SS of audio signals AS may have one or more of the same fundamental frequency, time signature and time. For example, the audio signals AS of the subset SS of audio signals AS may comprise sets s of audio segments as having one or more complementary frequencies, amplitudes, transforms, time durations and envelopes. As one example, the subset SS of audio signals AS may include four audio signals AS1-AS4, having a type of a harmony stem, a melody stem, a bass stem and a drum stem, respectively. The audio signals AS1-AS3 may have the same fundamental frequency, for example 261.626 Hz (middle C). Generally, drum stems do not have a fundamental frequency. The audio signals AS1-AS4 may have the same time signatures, for example 120 bpm, and the same time, for example 30 s. The audio signals AS1-AS4 may comprise sets s1-s4 of audio segments as1-as4 respectively, having one or more complementary, for example mutually complementary, frequencies, amplitudes, transforms, time durations and/or envelopes. In other words, for each of the sets s1-s4 of the audio segments as1-as4, the combination (or composition) of the audio segments as1-as4 may be, for example, acoustically harmonious and/or melodically i.e. in harmony and/or in melody. That is, audio segments as1-as4 are not selected arbitrarily or randomly, for example. The audio signals AS1-AS4 may be selected similarly, mutatis mutandis. In this way, the output audio identifier is further user-intelligible for human users, for example being hearable, memorable and/or comprehensible for the human users. In contrast, arbitrary or random selection of the audio signals AS1-AS4 and/or the audio segments as1-as4 may instead reduce user-intelligible for human users, for example being less hearable, less memorable and/or less comprehensible for the human users. In addition, since the audio identifiers, as described herein, may be acoustically harmonious and/or melodic, they may thus inherently include redundancy and/or error correction information such that an error and/or failure in reception of the audio identifier may be corrected. In this way, reception and/or decoding of the audio identifier may be improved. Furthermore, attempts to maliciously and/or fraudulently generate or replicate audio identifiers is thus more complex, since authentic or genuine audio identifiers, as described herein, may be acoustically harmonious and/or melodic. In this way, security is improved.

The computer device 100, for example the audio signal processor 110, is configured to process the selected subset SS of audio signals AS by combining the selected subset SS of audio signals AS to provide the audio identifier AI. The audio signal processor 110 may combine two or more of the selected subset SS of audio signals AS by summing and/or joining the two or more of the selected subset SS of audio signals AS, for example a first audio signal AS1 and a second audio signal AS2 of the selected subset SS of audio signals AS, as described below in more detail.

In one example, the computer device 100, for example the audio signal processor 110, is configured to combine the selected subset of audio signals by summing two or more of the selected subset SS of audio signals AS. That is, the two of the selected subset SS of audio signals AS, for example the first audio signal AS1 and the second audio signal AS2, may be combined in parallel, being concurrent or overlapping in time, for example a time of the first audio signal AS1 and/or the second audio signal AS2. For example, start times and/or end times of the first audio signal AS1 and the second audio signal AS2 may coincide, respectively.

Generally, summing is an audio mixing process whereby energy levels of individual audio signals, such as the first audio signal AS1 and the second audio signal AS2, when combined are at a desired total energy output level (i.e. a summed level). Note that summing (also known as combining or collapsing) of the first audio signal AS1 and the second audio signal AS2 is not a linear addition of the amplitudes thereof. The first audio signal AS1 and the second audio signal AS2 may be coherent or incoherent audio signals. For example, if the first audio signal AS1 and the second audio signal AS2 are coherent audio signals, if the first audio signal AS1 has a first level $L_1$ dB and the second audio signal AS2 has a second level of $L_2$ dB, then a combined audio signal provided by summing the first audio signal AS1 and the second audio signal AS2 has a level $L_3$ dB where $L_3=20 \log_{10}(10^{L_1/10}+10^{L_2/10})$. For example, if the first audio signal AS1 and the second audio signal AS2 are incoherent audio signals, if the first audio signal AS1 has a first level $L_1$ dB and the second audio signal AS2 has a second level of $L_2$ dB, then a combined audio signal provided by summing the first audio signal AS1 and the second audio signal AS2 has a level $L_3$ dB where $L_3=10 \log_{10}(10^{L_1/10}+10^{L_2/10})$. In one example, the first audio signal AS1 and the second audio signal AS2 are incoherent audio signals. In one example, the audio signals AS of the selected subset SS of audio signals AS are incoherent audio signals.

In one example, the computer device 100, for example the audio signal processor 110, is configured to combine the selected subset of audio signals by joining two or more of the selected subset SS of audio signals AS. That is, the two of the selected subset SS of audio signals AS, for example the first audio signal AS1 and the second audio signal AS2, may be combined in series, being consecutive over successive times. For example, an end time of the first audio signal AS1 may correspond with a start time of the second audio signal AS2. The start time of the second audio signal AS2 may be before, coincide with or be after the end time of the first audio signal AS1. In other words, the first audio signal AS1 and the second audio signal AS2 may at least partially overlap in time, be directly successive or may be spaced apart in time, respectively.

In one example, summing comprises summing two or more of the joined selected subset SS of audio signals AS. In one example, joining comprises joining two or more of the summed selected subset SS of audio signals AS.

In one example, the audio signal processor 110 is configured to insert an audio segment in the joined two of the selected subset SS of audio signals AS comprises. For example, the inserted audio segment may span an end time of the first audio signal AS1 and/or a start time of the second audio signal AS2. In this way, a transition from the first audio signal AS1 to the second audio signal AS2 may be improved, for example smoothed.

The computer device 100, for example the audio identifier outputter 150, is configured to output the audio identifier AI in an output audio signal as an output bitstream, wherein the audio identifier AI encodes the identifier I. The output audio signal thus comprises the combined, selected subset SS of audio signals AS. The output bitstream may be as described above with respect to the received respective bitstreams. That is, the output bitstream may be provided in an uncompressed audio format, a lossless compression audio format and/or a lossy compression audio format. Alternatively and/or additionally, the output bitstream may be provided in a multimedia or video format. The output bitstream may be stored on the computer device 100, for example in storage thereof. The output bitstream including the audio identifier AI in the output audio signal therein may be stored in a database mapped to and/or in association with the identifier/encoded by the corresponding audio identifier AI. In this way, a database comprising the identifiers/and encoded audio identifiers AI may be provided. The database may be a searchable database, whereby an identifier/corresponding to a searched audio identifier AI may be searched and/or identified. The database may be provided on the computer device 100 and/or on a server accessible via the network 1, for example. In this way, the database comprising the identifiers/and encoded audio identifiers AI may be accessed from other computer devices 100, for example.

In one example, a transform of the audio identifier AI and/or a part thereof is unique. The transform may be represented, for example, by a fast Fourier transform (FFT), an inverse fast Fourier transform (iFFT), a discrete Fourier transform (DFT) or a power spectrum. The transform may be determined for a frame having a frame size of, for example 512, 1024, 2048 or more samples i.e. $2^N$ samples, wherein N is a natural number.

In one example, the computer device 100 is configured to classify the audio signals AS of the set SS of audio signals according to a set SC of classifications C. By classifying the audio signals AS of the set SS of audio signals according to the set SC of classifications C, selection of the SS of audio signals AS may be facilitated. The set SC of classifications C may include at least a part of the audio signal information and/or the audio segment information. For example, the audio signals AS of the set SS of audio signals may be classified by at least one of a type, a fundamental frequency, a time signature and a time. For example, the audio signals AS of the set SS of audio signals may be classified by at least one of a frequency, an amplitude, a transform, a time duration and an envelope. In one example, the computer device 100 is configured to hierarchically classify the audio signals AS of the set SS of audio signals according to a set SC of classifications C, for example, according to at least a part of the audio signal information and/or the audio segment information. The audio signals AS may be classified, at least in part, according to a musical instrument classification. For example, in the Sachs-Hornbostel musical instrument classification groups musical instruments as: idiophones, such as the xylophone, which produce sound by vibrating themselves; membranophones, such as drums or kazoos, which produce sound by a vibrating membrane;

chordophones, such as the piano or cello, which produce sound by vibrating strings; aerophones, such as the pipe organ or oboe, which produce sound by vibrating columns of air; and electrophones, such as the electric guitar or electric bass, which produce sound through electricity and is required to be plugged into an amplifier.

The classifications C may be mapped to and/or associated with corresponding descriptors D.

In one example, the computer device 100, for example the audio signal processor 110, is configured to store the classified audio signals AS according to the set of classifications C. The classified audio signals AS may be stored on the computer device 100 and/or on a server accessible via the network 1, for example. In this way, the classified audio signals AS may be accessed from other computer devices 100, for example.

In one example, the computer device 100, for example the audio signal processor 110, is configured to select the subset SS of audio signals AS from the set S of audio signals AS according to the received identifier/by selecting the subset SS of audio signals AS from the set S of audio signals AS according to the received identifier/based, at least in part, on the set of classifications C.

In one example, the computer device 100, for example the audio signal processor 110 is configured to transmit at least a part of the audio identifier AI in the output audio signal via a network, such as the network 1 described above. In one example, the computer device 100 is configured to transmit the audio identifier AI in the output audio signal via a network. In this way, the audio identifier AI may be used as a security token, for example, whereby authorisation and/or authentication of a user of a computer device and/or a network service may be confirmed via a challenge and response protocol, as described previously. Additionally and/or alternatively, the audio identifier AI may be used as a security token, for example, whereby a user of a network service may confirm an origin and/or certification of the network service, as described previously.

In one example, the network 1 comprises a telephony service. Interaction between human users and telephony services, for example automated telephony services, may be relatively limited, for example in which the human users respond to audio transmitted by the telephony services by selecting keys on telephone keypads. By using the audio identifier AI as a security token on the telephony service, security may be improved, as described above, thereby reducing a vulnerability and/or threat due to spoofing, for example.

In one example, the computer device 100 to configured to receive at least a part of the transmitted audio identifier AI and to identify the identifier/by decoding the received part of the transmitted audio identifier AI. The computer device 100 may be configured to decode the received part of the transmitted audio identifier AI analogously to encoding, as described above. That is, as described above, the audio identifier AI encodes the identifier/and is included in the output audio signal. The computer device 100 may be configured to extract the combined selected subset SS of audio signals AS from the output audio signal. The computer device 100 may be configured to separate, divide and/or deconvolve the extracted, combined selected subset SS of audio signals AS, thereby providing the selected subset SS of audio signals AS. The computer device 100 may be configured to match the selected subset SS of audio signals AS against the set S of audio signals AS and thereby determine and/or derive the identifier/therefrom. Additionally and/or alternatively, the computer device 100 may be configured to search the database comprising the identifiers/ and encoded audio identifiers AI, as described above, for the received part of the transmitted audio identifier AI.

In one example, the audio identifier AI and/or the output audio signal comprises music. In this way, as described above, memorability and/or comprehensibility of the audio identifier may be increased.

At S201, the set S audio signals AS is provided by the audio signal provider 120 as respective bitstreams, wherein each audio signal AS of the set S of audio signals AS is defined based on audio signal information including at least one of a type, a fundamental frequency, a time signature and a time, wherein each audio signal AS comprises a set s of audio segments as, wherein each audio segment as of the set s of audio segments as is defined based on audio segment information including at least one of a frequency, an amplitude, a transform, a duration and an envelope.

At S202, an identifier/is received by the identifier receiver 130 and a subset SS of audio signals AS is selected from the set S of audio signals AS according to the received identifier/ based, at least in part, on the audio signal information and/or the audio segment information.

At S203, the selected subset of audio signals is processed by the audio signal combiner 140 by combining the selected subset SS of audio signals AS to provide an audio identifier AI.

At S204, the audio identifier AI is output by the audio signal outputter 150 in an output audio signal as an output bitstream, wherein the audio identifier AI encodes the identifier AI.

At S205, the output bitstream is optionally stored on the computer device 100.

Figure 3:
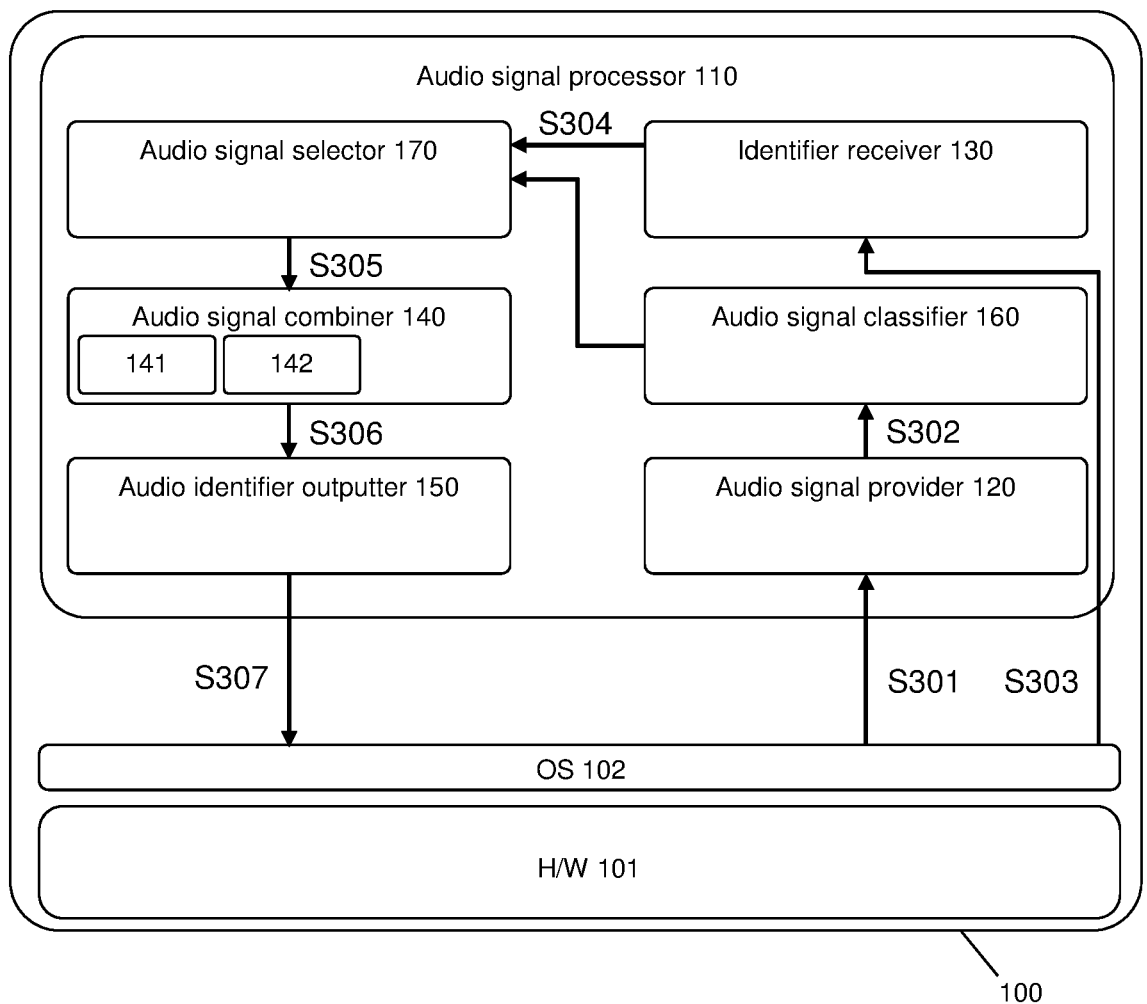
FIG. 3 is a schematic view of the computer device of FIG. 2, in more detail.

FIG. 3 is a schematic view of the computer device of FIG. 2, in more detail.

In addition to the audio signal provider 120, the identifier receiver 130, the audio signal combiner 140 and the audio identifier outputter 150 as described above, the audio signal processor 110 optionally comprises an audio signal classifier 160 and an audio signal selector 170. The audio signal combiner 140 optionally comprises an audio signal summer 141 and an audio signal joiner 142.

The audio signal classifier 160 is configured to classify the audio signals AS of the set SS of audio signals according to the set SC of classifications C, as described above with reference to FIG. 2. The audio signal classifier 160 may be configured to store the classified audio signals AS according to the set of classifications C, as described above with reference to FIG. 2. In more detail, the audio signal selector 170 is configured to is configured to select the subset SS of audio signals AS from the set S of audio signals AS according to the received identifier/based, at least in part, on the audio signal information and/or the audio segment information, as described above with reference to FIG. 2. The audio signal selector 170 may be configured to select the subset SS of audio signals AS from the set S of audio signals AS according to the received identifier/by selecting the subset SS of audio signals AS from the set S of audio signals AS according to the received identifier/based, at least in part, on the set of classifications C, as described above with reference to FIG. 2. The audio signal summer 141 is configured combine the selected subset of audio signals by summing two of the selected subset SS of audio signals AS, as described above with reference to FIG. 2. The audio signal joiner 142 is configured to combine the selected subset of audio signals by joining two of the selected subset SS of audio signals AS, as described above with reference to FIG. 2.

At S301, the set S audio signals AS is provided by the audio signal provider 120 as respective bitstreams, wherein each audio signal AS of the set S of audio signals AS is defined based on audio signal information including at least one of a type, a fundamental frequency, a time signature and a time, wherein each audio signal AS comprises a set s of audio segments as, wherein each audio segment as of the set s of audio segments as is defined based on audio segment information including at least one of a frequency, an amplitude, a transform, a duration and an envelope.

At S302, the audio signal classifier 160 classifies the audio signals AS of the set SS of audio signals according to the set SC of classifications C. The audio signal classifier 180 stores the classified audio signals AS according to the set of classifications C.

At S303, the identifier/is received by the identifier receiver 130.

At S304, the audio signal selector 170 selects a subset SS of audio signals AS from the set S of audio signals AS according to the received identifier/based, at least in part, on the audio signal information and/or the audio segment information. The audio signal selector 170 may select the subset SS of audio signals AS from the set S of audio signals AS according to the received identifier/by selecting the subset SS of audio signals AS from the set S of audio signals AS according to the received identifier/based, at least in part, on the set of classifications C.

At S305, the selected subset of audio signals is processed by the audio signal combiner 140 by combining the selected subset SS of audio signals AS to provide an audio identifier AI. The audio signal summer 141 may sum two of the selected subset SS of audio signals AS. The audio signal joiner 142 may join two of the selected subset SS of audio signals AS.

At S306, the audio identifier AI is output by the audio signal outputter 150 in an output audio signal as an output bitstream, wherein the audio identifier AI encodes the identifier AI.

At S307, the output bitstream is optionally stored on the computer device 100.

Figure 4:
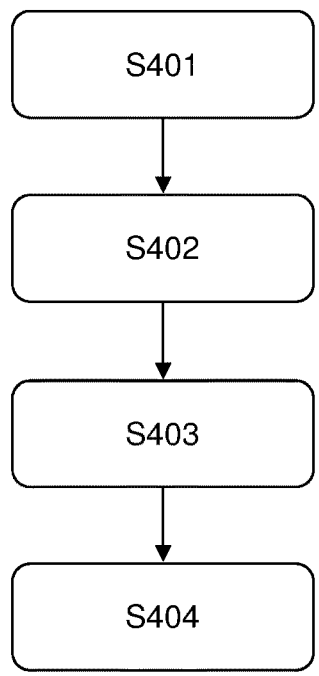
FIG. 4 is a schematic flow diagram of a method of processing audio signals according to an exemplary embodiment.

FIG. 4 is a schematic flow diagram of a method of encoding identifiers by providing audio identifiers therefrom according to an exemplary embodiment. Particularly, the method of encoding identifiers by providing audio identifiers therefrom is implemented on a computer device, for example the computer device 100 as described above, the method being implemented by hardware of the computer device including at least a processor and a memory.

At S401, a set of audio signals is provided as respective bitstreams, wherein each audio signal of the set of audio signals is defined based on audio signal information including at least one of a type, a fundamental frequency, a time signature and a time, wherein each audio signal comprises a set of audio segments, wherein each audio segment of the set of audio segments is defined based on audio segment information including at least one of a frequency, an amplitude, a transform, a duration and an envelope.

At S402, an identifier is received and a subset of audio signals is selected from the set of audio signals according to the received identifier based, at least in part, on the audio signal information and/or the audio segment information.

At S403, the selected subset of audio signals is processed by combining the selected subset of audio signals to provide an audio identifier.

At S404, the audio identifier is output in an output audio signal as an output bitstream, wherein the audio identifier encodes the identifier.

The method may include any steps described herein. For example, combining the selected subset of audio signals may comprise summing two of the selected subset of audio signals. For example, combining the selected subset of audio signals may comprise joining two of the selected subset of audio signals. For example, joining the two of the selected subset of audio signals may comprise inserting an audio segment therein. For example, the method may comprise classifying the audio signals of the set of audio signals according to a set of classifications; and storing the classified audio signals according to the set of classifications. For example, selecting the subset of audio signals from the set of audio signals according to the received identifier comprises selecting the subset of audio signals from the set of audio signals according to the received identifier based, at least in part, on the set of classifications. For example, the method may comprise transmitting at least a part of the audio identifier in the output audio signal via a network. For example, the network may comprise a telephony service. For example, the method may comprise receiving at least a part of the transmitted audio identifier and identifying the audio identifier based on the received at least the part thereof. For example, audio identifier and/or the output audio signal may comprise music.

Figure 5:
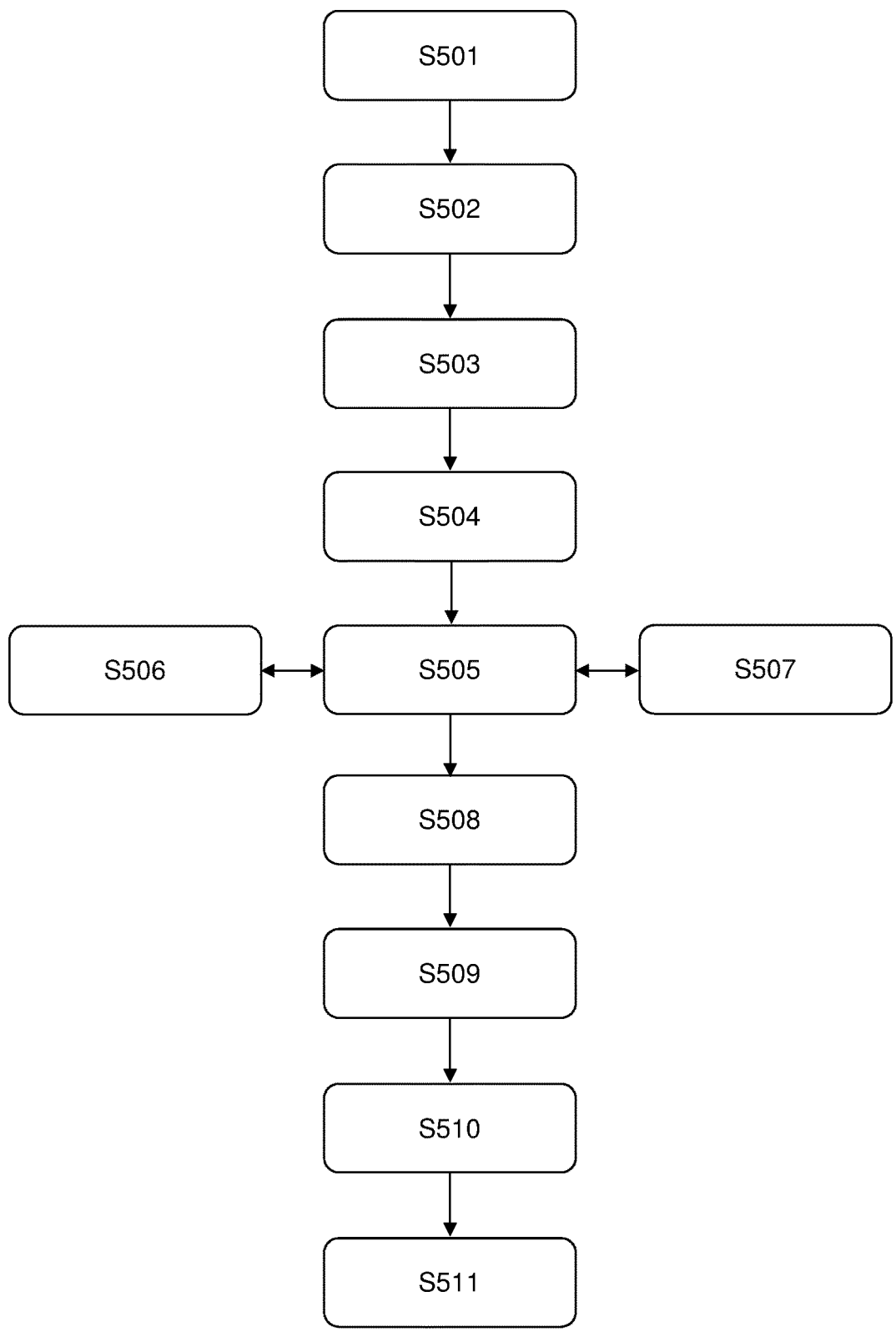
FIG. 5 is a schematic flow diagram of the method of processing audio signals of FIG. 4, in more detail.
Figure 6A:
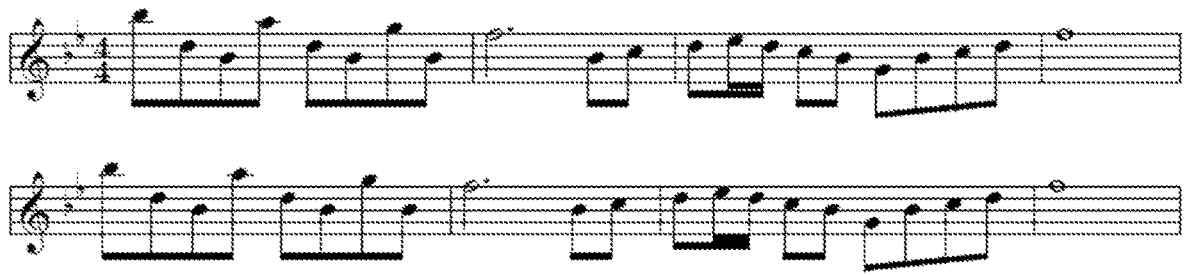
FIGS. 6A to 6H are schematic views of example audio signals.
Figure 6B:
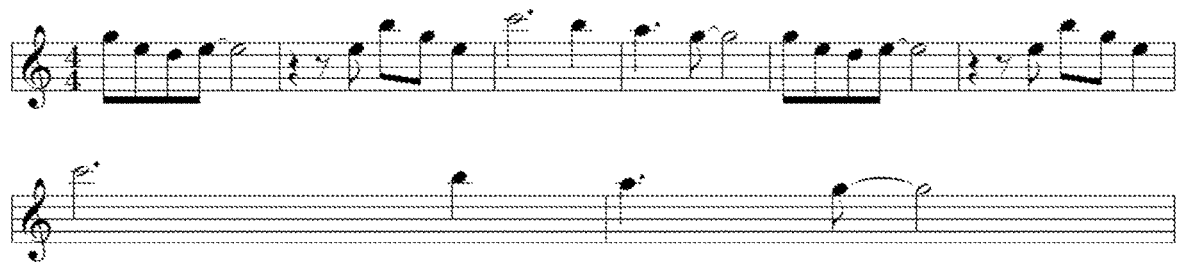
Figure 6C:
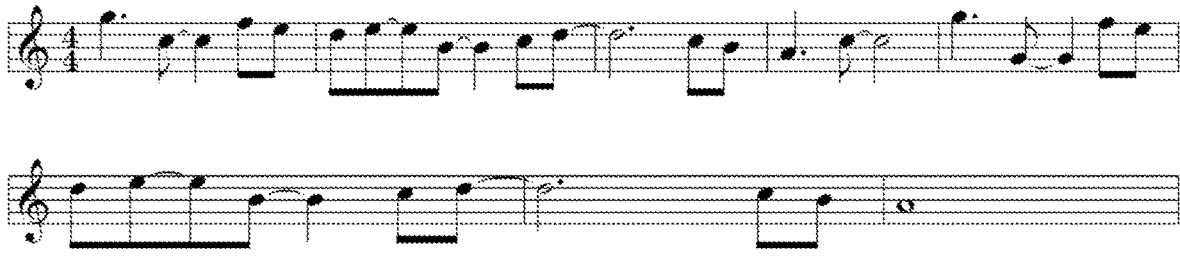
Figure 6D:
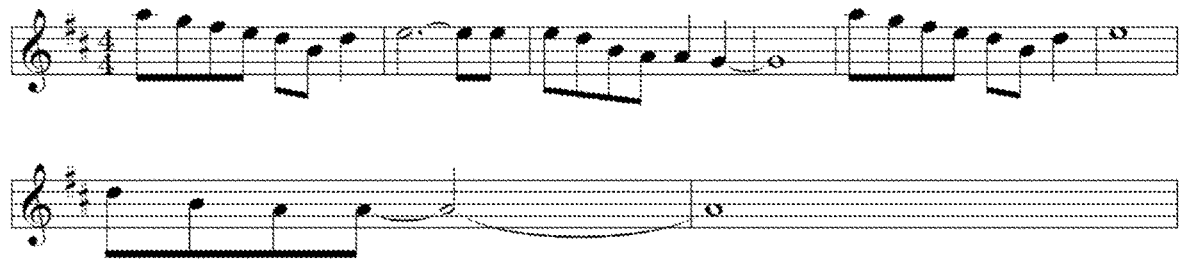
Figure 6E:
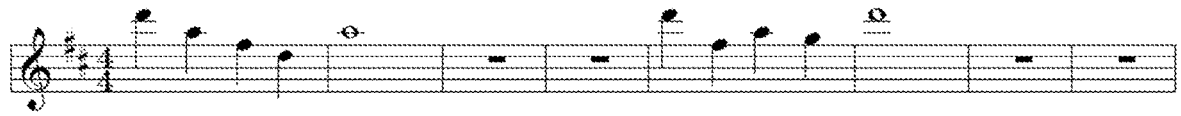
Figure 6F:
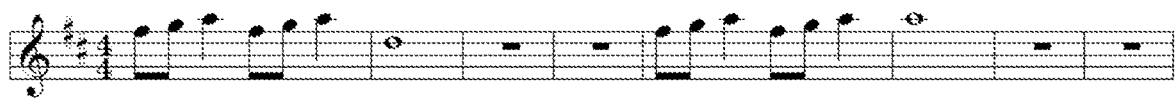
Figure 6G:
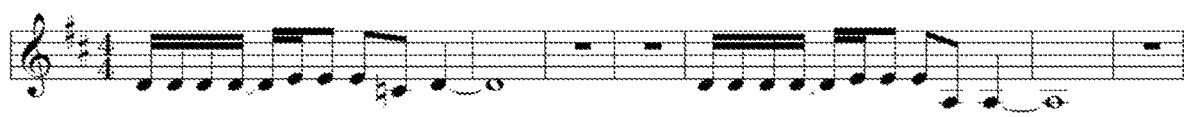
Figure 6H:
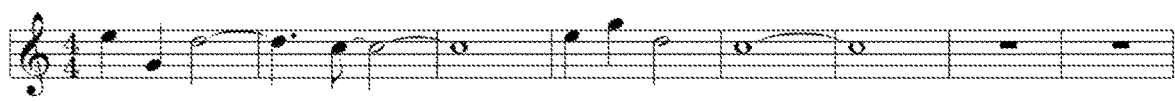

FIG. 5 is a schematic flow diagram of a method of encoding identifiers by providing audio identifiers therefrom according to an exemplary embodiment. Particularly, the method of encoding identifiers by providing audio identifiers therefrom is implemented on a computer device, for example the computer device 100 as described above, the method being implemented by hardware of the computer device including at least a processor and a memory.

At S501, a set S of audio signals AS is provided as respective bitstreams, wherein each audio signal AS of the set S of audio signals AS is defined based on audio signal information including at least one of a type, a fundamental frequency, a time signature and a time, wherein each audio signal AS comprises a set s of audio segments as, wherein each audio segment as of the set s of audio segments as is defined based on audio segment information including at least one of a frequency, an amplitude, a transform, a duration and an envelope. In this example, at least 10,000 audio signals AS are provided, having harmony, melody, bass and/or drum stem types, for different keys (i.e. fundamental frequencies), for different tempos (i.e. time signatures) and from different musical instrument types, including string, wind and percussion (i.e. audio segment information thus provided).

At S502, the audio signals AS of the set SS of audio signals are classified according to the set SC of classifications C, including the stem types, the musical instrument types and the tempos. The classified audio signals AS are stored according to the set of classifications C.

At S503, the identifier/is received. In this example, the identifier I consists of a plurality of words related to descriptors D mapped to the classifications C, as described above.

At S504, a subset SS of audio signals AS is selected from the set S of audio signals AS according to the received identifier/based, at least in part, on the audio signal information and/or the audio segment information. The subset SS of audio signals AS is selected from the set S of audio signals AS according to the received identifier/by selecting the subset SS of audio signals AS from the set S of audio signals AS according to the received identifier/based, at least in part, on the set of classifications C. In this example, the subset SS of audio signals AS includes fourteen complementary audio signals AS, including six harmony stems, four melody stems, two bass stems and two drum stems.

At S505, the selected subset of audio signals is processed by the audio signal combiner 140 by combining the selected subset SS of audio signals AS to provide an audio identifier AI.

At S506, seven of the selected subset SS of audio signals AS are summed. Particularly, three harmony stems, two melody stems, one bass stem and one drum stem are summed, thereby providing a first summed audio signal. The remaining three harmony stems, two melody stems, one bass stem and one drum stem are also summed, thereby providing a second summed audio signal.

At S507, the first summed audio signal and the second summed audio signal are joined, thereby providing an output audio signal.

At S508, the audio identifier AI is output in the output audio signal as an output bitstream, wherein the audio identifier AI encodes the identifier AI.

At S509, the output bitstream is stored together with the identifier I.

At S510, the output bitstream is transmitted via a network. In this example, the audio identifier AI is used as a security token, as described above.

At S511, the transmitted bitstream is received and the audio identifier AI decoded, thereby identifying the identifier I and confirming an origin of the bitstream.

FIGS. 6A to 6H show example audio signals AS.

Particularly, FIGS. 6A-6D show examples of phrases. Generally, in music theory, a phrase is a unit of musical meter that has a complete musical sense of its own, built from figures, motifs, and cells, and combining to form melodies, periods and larger sections.

Particularly, FIGS. 6E-6H show examples of fragments. Generally, in music composition, fragmentation is the use of fragments or the division of a musical idea (gesture, motive, theme, etc.) into segments.

FIGS. 7A to 7E show example classifications C for a set S of audio signals AS. Particularly, the set S of audio signals AS are classified hierarchically, by stem type, by style and by instrument type.

Figure 7A:
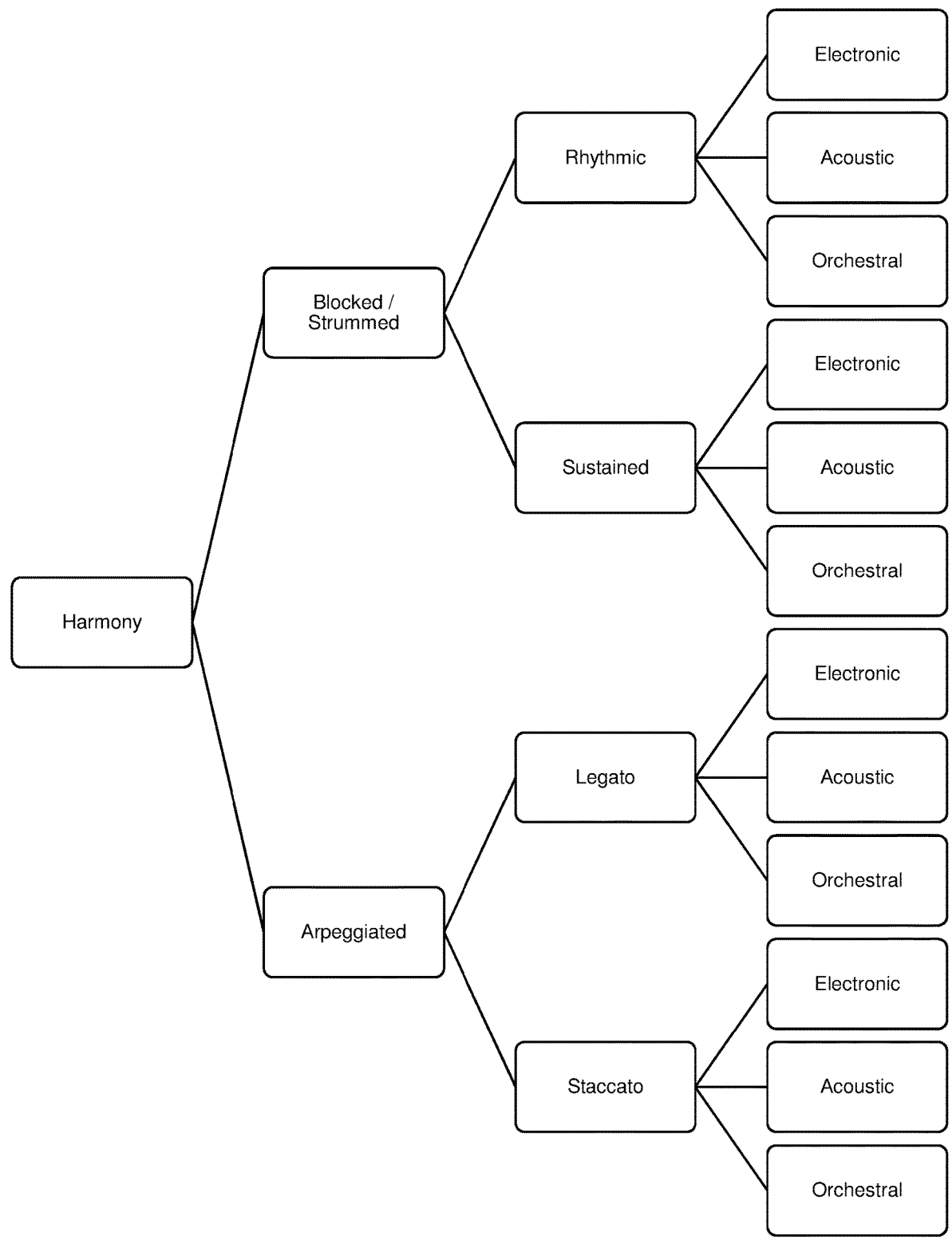
FIGS. 7A to 7E are schematic views of example classifications of audio signals.

FIG. 7A shows that a harmony stem type is hierarchically classified as blocked/strummed or arpeggiated style. In turn, these styles are hierarchically classified as rhythmic or sustained and legato or staccato sub-styles, respectively. In turn, each of these sub-styles are hierarchically classified as electronic, acoustic, or orchestral.

Figure 7B:
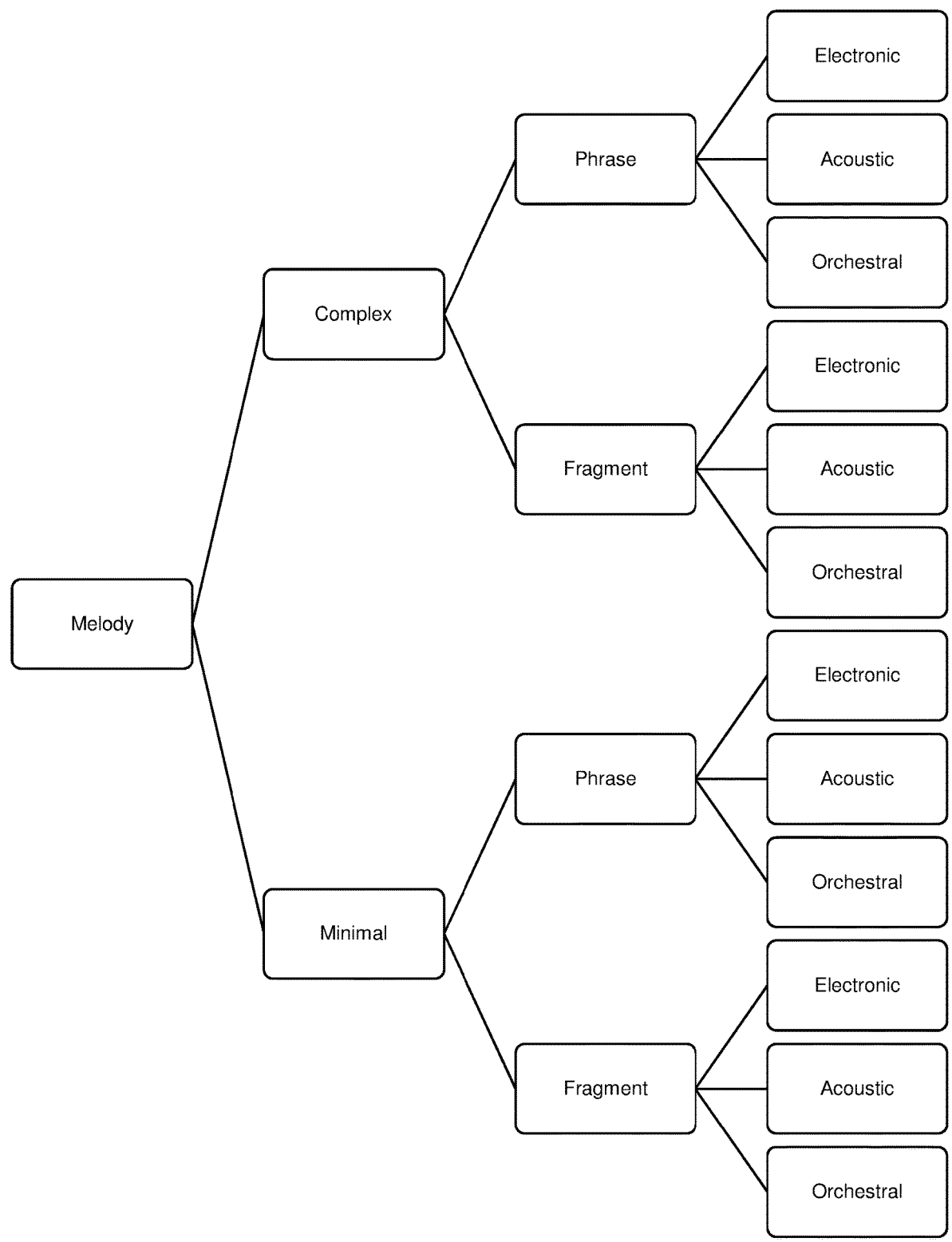

FIG. 7B shows that a melody stem type is hierarchically classified as complex or minimal style. In turn, these styles are both hierarchically classified as a phrase or a fragment. In turn, each of these are hierarchically classified as electronic, acoustic, or orchestral.

Figure 7C:
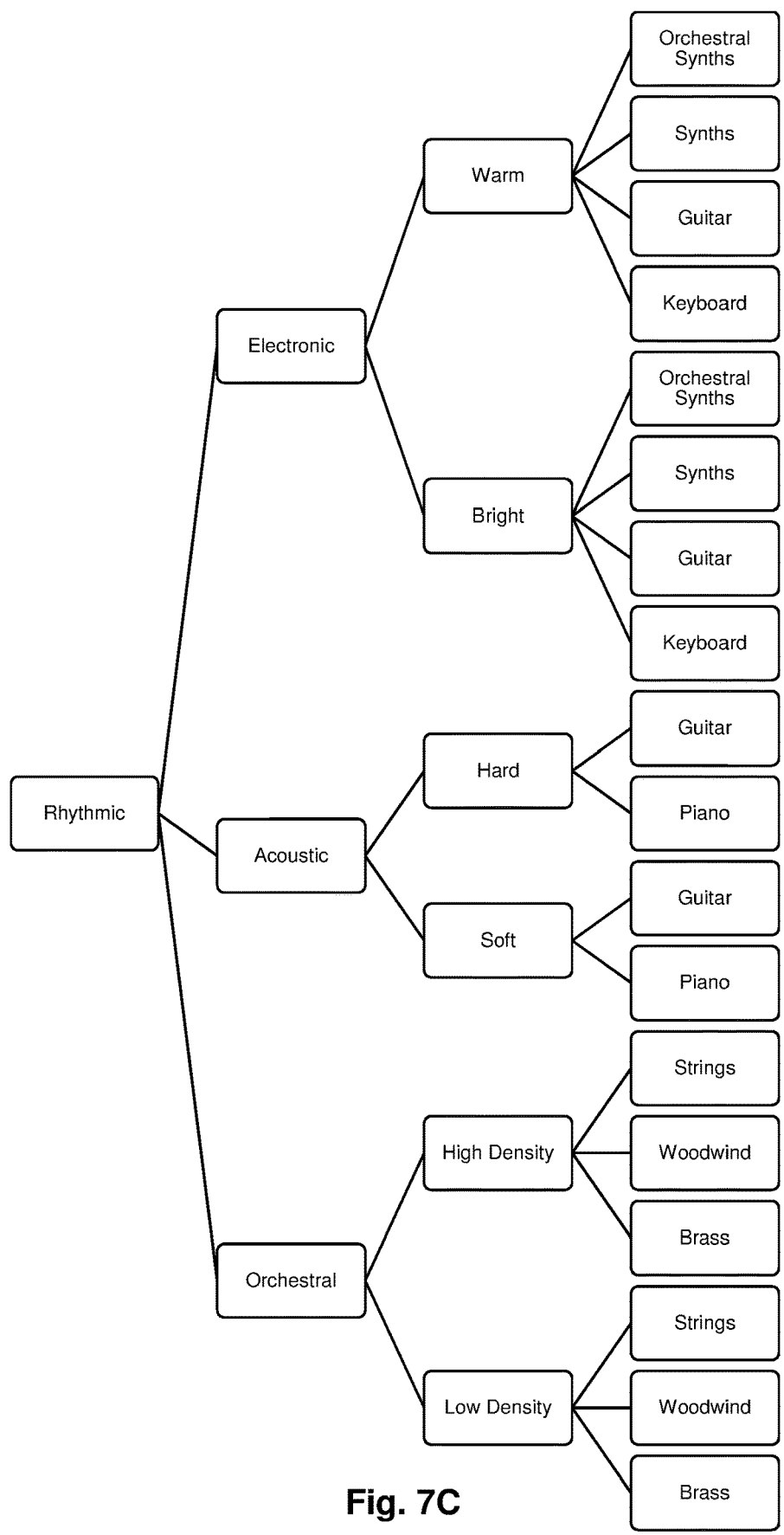

FIG. 7C shows that a rhythmic sub-style is hierarchically classified as electronic, acoustic, or orchestral. In turn, each of these are hierarchically classified as warm or bright, hard or soft and high density and low density, respectively. In turn, warm and bright are both hierarchically classified as orchestral synths, synths, guitar or keyboard. In turn, hard and soft are both hierarchically classified as guitar or piano. In turn, high density and low density are both hierarchically classified as strings, woodwind or brass. Sustained, legato and staccato harmony types are similarly hierarchically classified. Complex and minimal melody types are similarly hierarchically classified.

Figure 7D:
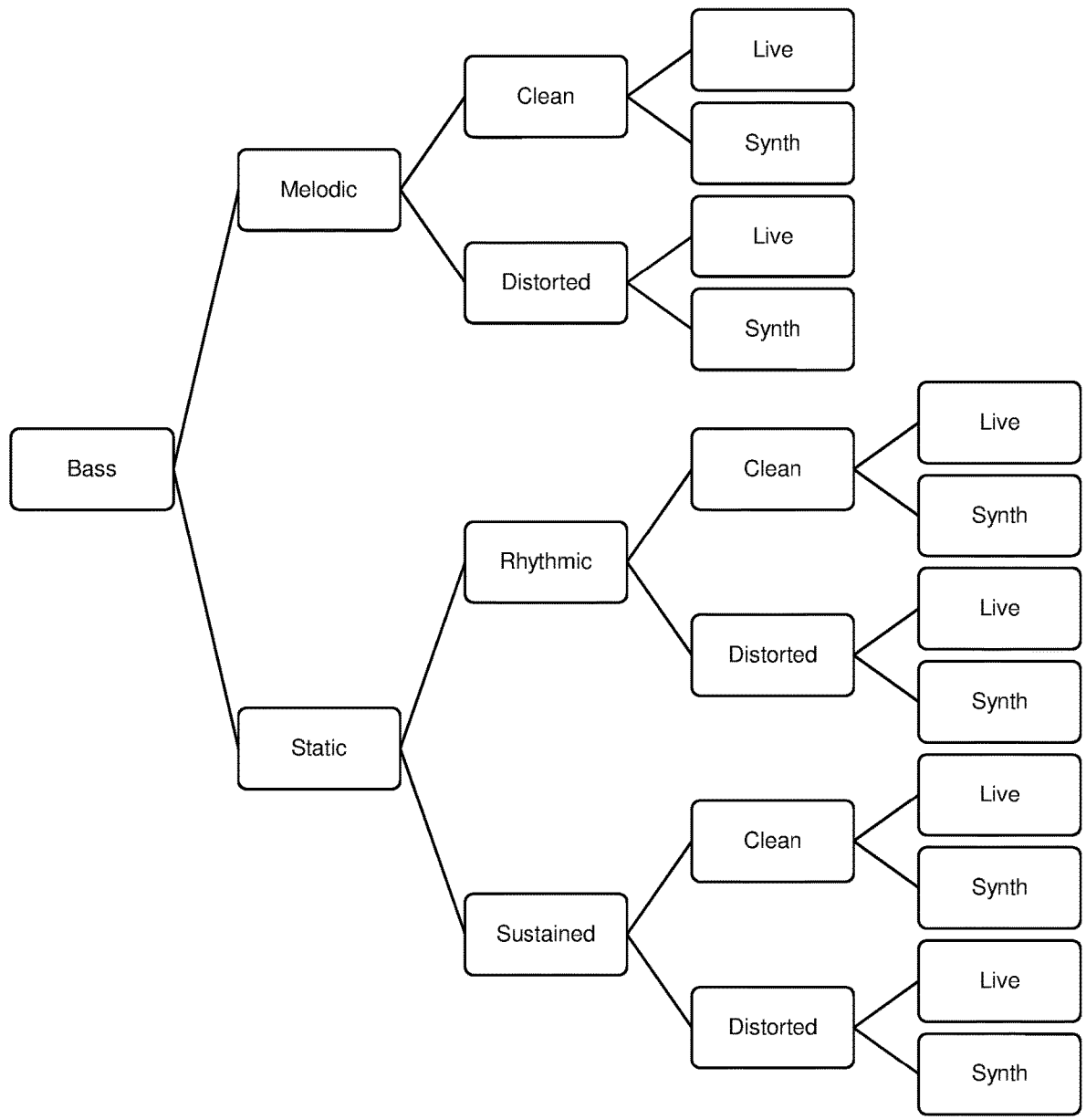

FIG. 7D shows that a bass stem type is hierarchically classified as melodic or static. In turn, these are hierarchically classified as clean or distorted and rhythmic or sustained, respectively. In turn, both rhythmic and sustained are hierarchically classified as clean or distorted. In turn, both clean and distorted are hierarchically classified as live or synth.

Figure 7E:
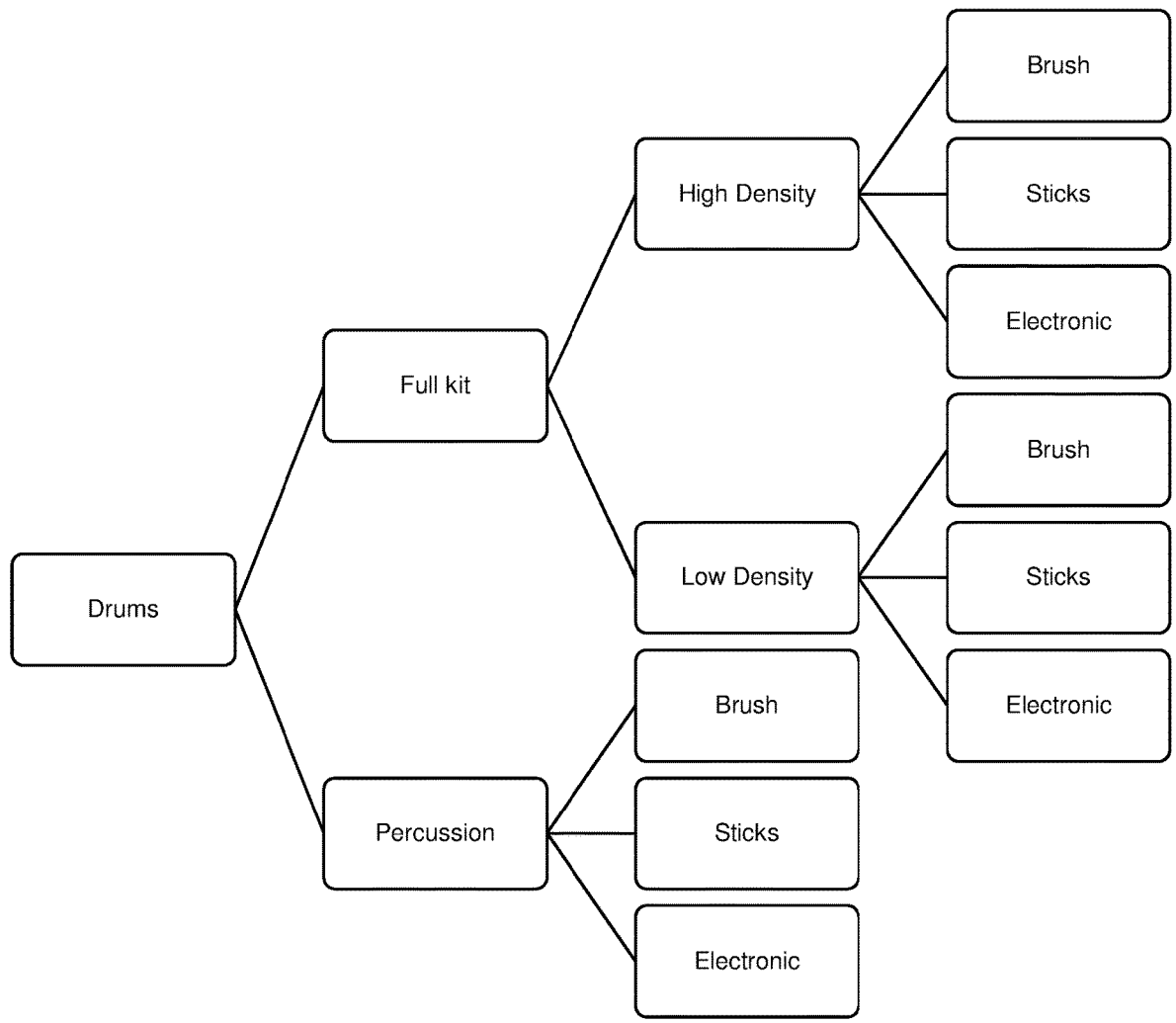

FIG. 7E shows that a drums stem type is hierarchically classified as full kit or percussion. In turn, full kit is hierarchically classified as high density or low density. In turn, high density, low density and percussion are hierarchically classified as brush, sticks or electronic.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processor circuits. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" may mean including the component(s) specified but is not intended to exclude the presence of other components.

Although a few example embodiments have been shown and described, it will be appreciated by those skilled in the art that various changes and modifications might be made without departing from the scope of the invention, as defined in the appended claims.

The invention claimed is:

1. A computer device, including at least a processor and a memory, configured to encode identifiers by providing audio identifiers therefrom, the computer device configured to:
   provide a set of audio signals as respective bitstreams, wherein each audio signal of the set of audio signals is defined based, at least in part, on audio signal information including at least one of a type, a fundamental frequency, a time signature and a time, wherein each audio signal comprises a set of audio segments, wherein each audio segment of the set of audio segments is defined based, at least in part, on audio segment information including at least one of a frequency, an amplitude, a transform, a time duration and an envelope;
   receive an identifier and select a subset of audio signals from the set of audio signals according to the received identifier based, at least in part, on the audio signal information and/or the audio segment information;

process the audio selected subset of audio signals by combining the selected subset of audio signals to provide an unique audio identifier wherein elements, features and/or information of the received identifier are encoded by corresponding and/or respective elements, features and/or information of the unique audio identifier and wherein the unique audio identifier is time-varying and includes redundancy and/or error correction; and output the unique audio identifier in an output audio signal as an output bitstream, wherein the unique audio identifier encodes the received identifier.

2. The computer device according to claim 1, wherein the computer device is configured to:

combine the selected subset of audio signals comprises by summing two of the selected subset of audio signals.

3. The computer device according to claim 1, wherein the computer device is configured to:

combine the selected subset of audio signals by joining two of the selected subset of audio signals.

4. The computer device according to claim 3, wherein the computer device is configured to:

insert an audio segment in the joined two of the selected subset of audio signals.

5. The computer device according to claim 1, wherein the computer device is configured to:

classify the audio signals of the set of audio signals according to a set of classifications; and store the classified audio signals according to the set of classifications.

6. The computer device according to claim 5, wherein the computer device is configured to:

select the subset of audio signals from the set of audio signals according to the received identifier by selecting the subset of audio signals from the set of audio signals according to the received identifier based, at least in part, on the set of classifications.

7. The computer device according to claim 1, wherein the computer device is configured to:

transmit at least a part of the audio identifier in the output audio signal via a network.

8. The computer device according to claim 7, wherein the network comprises a telephony service.

9. The computer device according to claim 7, wherein the computer device is configured to:

receive at least a part of the transmitted audio identifier and to identify the identifier by decoding the received part of the transmitted audio identifier.

10. A method of encoding identifiers by providing audio identifiers therefrom on a computer device, the method being implemented by hardware of the computer device including at least a processor and a memory, the method comprising:

providing a set of audio signals as respective bitstreams, wherein each audio signal of the set of audio signals is defined based on audio signal information including at least one of a type, a fundamental frequency, a time signature and a time, wherein each audio signal comprises a set of audio segments, wherein each audio segment of the set of audio segments is defined based on audio segment information including at least one of a frequency, an amplitude, a transform, a duration and an envelope;

receiving an identifier and selecting a subset of audio signals from the set of audio signals according to the received identifier based, at least in part, on the audio signal information and/or the audio segment information;

processing the selected subset of audio signals by combining the selected subset of audio signals to provide an unique audio identifier wherein elements, features and/or information of the received identifier are encoded by corresponding and/or respective elements, features and/or information of the unique audio identifier and wherein the unique audio identifier is time-varying and includes redundancy and/or error correction; and outputting the unique audio identifier in an output audio signal as an output bitstream, wherein the unique audio identifier encodes the received identifier.

11. The method according to claim 10, wherein combining the selected subset of audio signals comprises summing two of the selected subset of audio signals.

12. The method according to claim 10, wherein combining the selected subset of audio signals comprises joining two of the selected subset of audio signals.

13. The method according to claim 12, wherein joining the two of the selected subset of audio signals comprises inserting an audio segment therein.

14. The method according to claim 10, comprising:

classifying the audio signals of the set of audio signals according to a set of classifications; and storing the classified audio signals according to the set of classifications.

15. The method according to claim 14, wherein selecting the subset of audio signals from the set of audio signals according to the received identifier comprises selecting the subset of audio signals from the set of audio signals according to the received identifier based, at least in part, on the set of classifications.

16. The method according to claim 10, comprising:

transmitting at least a part of the audio identifier in the output audio signal via a network.

17. The method according to claim 16, wherein the network comprises a telephony service.

18. The method according to claim 17, comprising:

receiving at least a part of the transmitted audio identifier and identifying the identifier by decoding the received part of the transmitted audio identifier.

19. The method according to claim 10, wherein the fundamental frequency is in a range from 10 Hz to 16,000 Hz, preferably in a range from 60 Hz to 4,000 Hz, more preferably from 125 Hz to 1,000 Hz and/or wherein the frequency is in a range from 20 Hz to 20,000 Hz, preferably in a range from 100 Hz to 10,000 Hz, more preferably in a range from 300 Hz to 3,400 Hz.

20. A tangible non-transient computer-readable storage medium having recorded thereon instructions which when implemented by computer device including at least a processor and a memory, cause the computer device to perform a method of encoding identifiers by providing audio identifiers therefrom on the computer device, the method according to claim 12.

* * * * *